United States Patent [19]
Morse

[11] 3,722,998
[45] Mar. 27, 1973

[54] LIQUID CRYSTAL APPARATUS FOR REDUCING CONTRAST

[75] Inventor: John E. Morse, Rochester, N.Y.

[73] Assignee: Eastman Kodak Company, Rochester, N.Y.

[22] Filed: Oct. 19, 1970

[21] Appl. No.: 81,959

[52] U.S. Cl..................355/71, 96/44, 350/160 R, 350/312, 353/20, 355/80
[51] Int. Cl..................................................G03b 27/76
[58] Field of Search..............355/71, 80; 353/20, 21; 350/312, 160, 160 LC; 250/211; 96/44

[56] References Cited

UNITED STATES PATENTS

| | | | |
|---|---|---|---|
| 2,949,498 | 8/1960 | Jackson | 250/212 X |
| 3,499,112 | 3/1970 | Heilmeier | 178/7.7 |
| 3,521,954 | 7/1970 | French | 355/71 X |
| 3,574,458 | 4/1971 | French | 355/71 X |
| 3,575,510 | 4/1971 | Kohashi | 355/71 X |
| 3,431,048 | 3/1969 | Ludovici | 353/20 X |

OTHER PUBLICATIONS

EEE, August, 1968, Vol. 16, pp. 25, 26, 28.
IBM Technical Disclosure Bulletin, Vol. 12, No. 6, Nov. 1969.

*Primary Examiner*—John M. Horan
*Assistant Examiner*—Monroe H. Hayes
*Attorney*—Robert W. Hampton and Gary D. Fields

[57] ABSTRACT

An apparatus is provided for masking a projected image from a slide transparency which apparatus includes interposing in the projection path a photoconductor-liquid crystal sandwich comprising a layered structure having in order, a first transparent electrode, a transparent layer, a liquid crystal layer and a second transparent electrode, and including means for applying a potential between the transparent electrodes. Upon projection of the transparency image, the lighter areas will cause the photoconductive material to become more conductive than will the darker areas so that the corresponding areas of the liquid crystal layer will become diffuse thereby diffusing some of the light away from the optical system in the brighter areas to provide an image on the photosensitive surface which has less contrast than the original transparency image.

6 Claims, 2 Drawing Figures

PATENTED MAR 27 1973 3,722,998
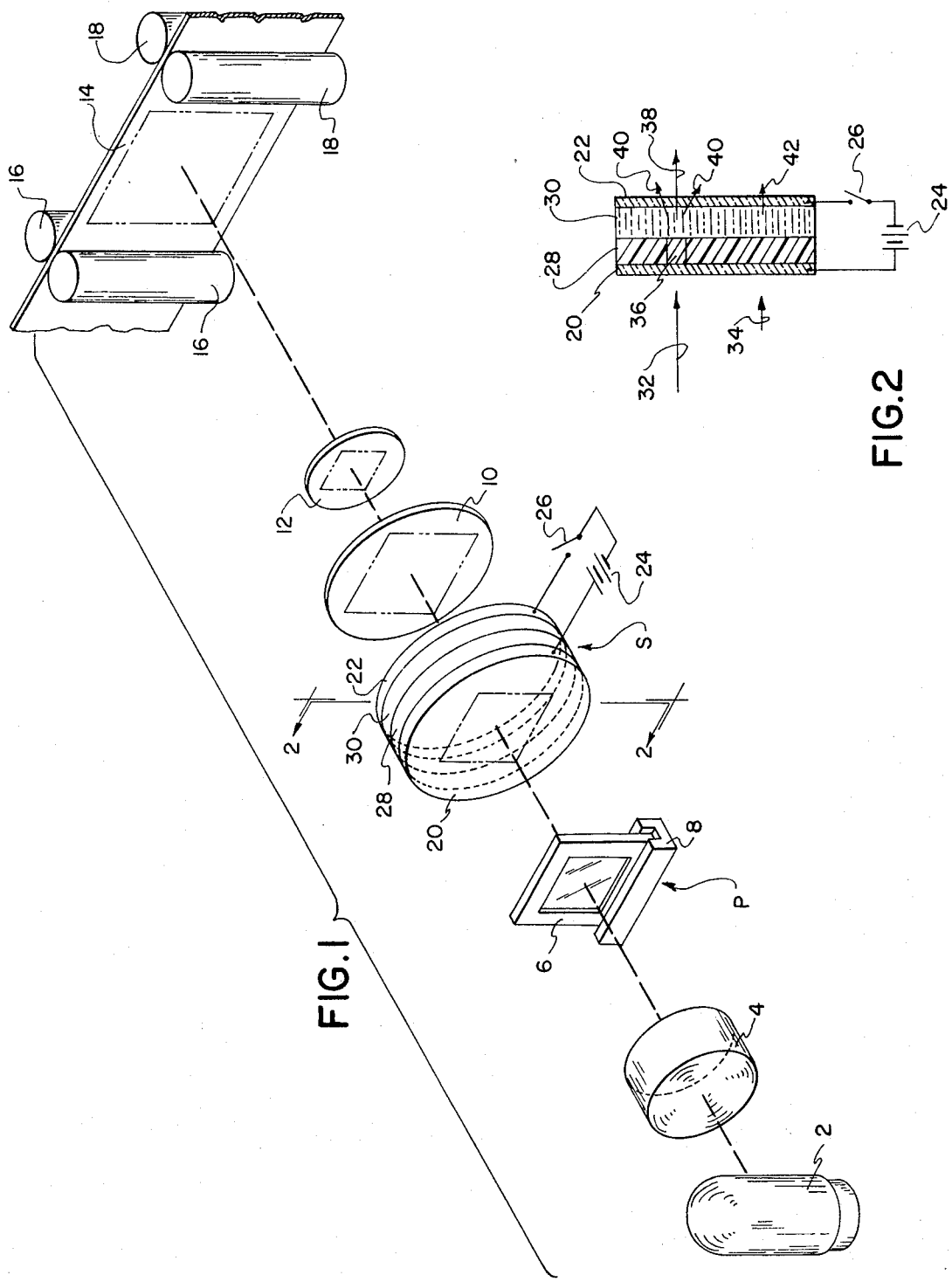
JOHN E. MORSE
INVENTOR.
BY Gary D. Fields
Robert W. Hampton
ATTORNEYS

LIQUID CRYSTAL APPARATUS FOR REDUCING CONTRAST

BACKGROUND OF THE INVENTION

1. Field of the Invention

In accordance with this invention a masking apparatus and method is provided, and more particularly a masking apparatus for reducing contrast of an image projected from a slide transparency original.

2. Description of the Prior Art

Toward the end of the 19th century F. Reinitzer and O. Lehmann independently observed that certain substances in passing from a solid crystalline state to an isotropic liquid state pass through a state or condition over a given temperature range wherein they display rheological properties similar to that of fluids, but have optical properties similar to that of the crystalline state. In order to identify these properties, Lehmann used the term "liquid crystal," which terminology persists today. Present thinking tends to regard substances which exhibit these properties as being in a fourth state of matter known as the mesomorphic state or mesophase since it is a state or phase intermediate that of the anisotropic crystal and that of the isotropic liquid.

There are three distinct mesomorphic states or forms, namely, the smectic mesophase, the nematic mesophase and the cholesteric mesophase. A nematic liquid crystal is essentially transparent, and therefore transmits light, but when placed in a d.c. electric field the molecules of some of these liquid crystals become disoriented so that the material diffuses light and becomes milky white in appearance. When the d.c. electric field is removed, the molecules of the liquid crystal return to their previous orientation so that the liquid crystal is again transparent. This phenomena is discussed in PROCEEDINGS OF THE I.E.E.E., for July 1968 in an article entitled: "Dynamic Scattering: A New Electro-optical Effect in Certain Classes of Nematic Liquid Crystals," by Heilmeier, Zanoni and Barton at pages 1162–1171.

The reflective optical storage effect of mixtures of cholesteric and nematic liquid crystal materials is discussed in a paper appearing in APPLIED PHYSICS LETTERS for Aug. 15, 1968 in an article entitled, "A New Electric Field Controlled Reflective Optical Storage Effect in Mixed-Liquid Crystal Systems," by Heilmeier and Goldmacher at pages 132 and 133, in which the authors describe how a mixture of nematic and cholesteric mesomorphic materials serve as an optical storage under a d.c. or low frequency a.c. electric field, which changes the initially transparent material to a milky white light-diffusing material. The liquid crystal material remains in the light-diffusing state upon removal of the d.c. field. The mixture can be rapidly erased or changed back to a transparent state by the application of a high frequency a.c. signal greater than 700 Hz.

A serious problem which occurs when printing from slide transparencies onto photosensitive paper is that the resulting print has too high a contrast due to the relatively long exposure scale of the slide transparency. Thus, it is necessary to mask the projected image from the slide transparency to get a projected image of reduced contrast which is satisfactory for making prints. One method of accomplishing this is to attach a strip of unexposed film to the ready mount which contains the slide transparency with double coated tape and expose it through the slide transparency. The filmstrip is then processed with surface application of a viscous developer to form a mask. Next, the assembly is moved to a printing position where a printing light is supplied through the mask and transparency and projected by a printing lens onto photographic paper. The difficulties with such a system are readily apparent. It requires adequate means for attaching and removing the filmstrip from the ready mount and also severe registry problems may be encountered due to mask expansion during development. In addition, a viscous wet developer must be provided and means must be made for disposition of used and useless masks. Such a procedure is tedious and time consuming thereby increasing the cost of making prints from slide transparencies.

SUMMARY OF THE INVENTION

In accordance with this invention, masking is accomplished by means of a photoconductor-liquid crystal sandwich. This sandwich includes in order a first transparent electrode, a transparent photoconductive layer, a liquid crystal layer and a second transparent electrode and also includes means for applying a d.c. potential between the first and second electrodes. This sandwich is placed in the projection path when projecting an image from the slide transparency onto a photosensitive surface and is positioned so that the first electrode faces toward the transparency. With a d.c. potential applied between the electrodes, when an image is projected onto the photoconductive surface, the exposed areas will become more conductive than the unexposed areas and will cause the corresponding areas of liquid crystal to diffuse light more than the corresponding areas to the unexposed portions of the photoconductive material. Therefore, the resulting projected image on the photosensitive material, such as photographic material, will have less brightness in the exposed areas than does the original image thereby reducing the contrast.

The image on the liquid crystal, which can be of the nematic type, can be removed by removing the d.c. potential between the electrodes and the sandwich can be reused for the next transparency to be exposed. Thus, no registration problems are encountered nor does the mask have to be thrown away after use since it can be reused again and again.

Additional advantages of this invention will be readily apparent from the description which follows, taken in conjunction with the accompanying drawings.

BRIEF DESCRIPTION OF THE DRAWINGS

FIG. 1 is a perspective view of a projection device for projecting a slide transparency image onto a photosensitive material utilizing a photoconductor-liquid crystal sandwich masking device constructed in accordance with this invention; and FIG. 2 is a horizontal section through the photoconductor-liquid crystal sandwich, taken along line 2—2 of FIG. 1, and showing the effect of the masking device on the projected image.

DESCRIPTION OF THE PREFERRED EMBODIMENT

It is well known that liquid crystals, particularly those of the nematic type or a combination of nematic and cholesteric materials are normally transparent but can be made to diffuse light by applying a potential across them. In accordance with this invention by interposing a photoconductor-liquid crystal sandwich in the projection path along which an image of a slide transparency is projected, the liquid crystal can be used to diffuse some of the light in highly illuminated areas so that a lesser amount of the light strikes the photosensitive material, such as photographic material on which a print of the slide transparency image is to be made. Thus, the reduced contrast required for making a print from a transparency can be accomplished without the necessity of developing a mask and registering it with the transparency original, as by laminating. A projection device is illustrated in FIG. 1 which includes a source of illumination such as lamp 2 and a condenser lens 4 for providing illumination to a slide transparency 6 which may be removably mounted in a support 8. The image on the slide transparency is projected through photoconductor-liquid crystal sandwich S, in a manner to be described and is projected by a field lens 10 and an objective lens 12 onto a photosensitive material 14 which is illustrated as being supported and fed by opposed rollers 16 and 18. It is of course understood, as would be apparent to one of ordinary skill in the art, that the transparency 6, the photoconductor-liquid crystal sandwich S and the field lens 10 should be substantially juxtaposed in order to obtain the desired image projection; and the particular locations shown in FIG. 1 being for the purpose of facilitating illustration.

As best seen in FIG. 2, the photoconductor-liquid crystal sandwich S comprises a pair of spaced transparent electrodes 20 and 22 such as NESA glass, connected to a source of potential 24 which can be applied by means of a switch 26. A photoconductive layer 28 is provided adjacent electrode 20 in contiguous relationship therewith and a liquid crystal layer 30 is provided between electrode 22 and photoconductive layer 28, as shown. It will be understood that the photoconductive material 28 is also transparent so that the image on slide transparency 6 may be projected through the sandwich S onto photosensitive surface 14. Since a slide transparency has a relatively long exposure scale, the contrast between the lighter and darker areas thereof is greater than that permissible for making a high quality print, as on photographic paper. In FIG. 2, the projection of light through one of the lighter areas is indicated symbolically by long arrow 32 whereas projection of light through a darker area is indicated by shorter arrow 34. When little or no illumination is projected onto photoconductive member 28 it is insulating and therefore most of the potential drop between electrodes 20 and 22 is across the photoconductive layer 28 and very little potential drop is across liquid crystal layer 30. In this condition, the liquid crystal layer is transparent so that light may be projected therethrough. However, upon exposure of the photoconductive layer it becomes more conductive so that a greater potential drop exists across liquid crystal 30 which causes the nematic liquid crystal material to diffuse some of the light. Photoconductive layer 28 can be made selectively conductive by projecting the image from slide transparency 6 through it. In areas of high illumination such as that represented by arrow 32, the photoconductive material becomes conductive in area 36 but remains insulative in areas where little or no light such as the light represented by arrow 34 strikes. As a result, the liquid crystal layer 30 becomes light diffusing in areas corresponding to the exposed areas of the photoconductive layer but remain transparent in other areas. Thus, the light as represented by arrow 32 is diffused to some extent so that the amount of light which is transmitted through the liquid crystal layer to be projected onto the photosensitive layer 14 is of lesser magnitude and is represented by a somewhat shorter arrow 38. Some of the light is diffused as indicated by arrows 40 and does not strike the objective lens 12 and therefore does not expose the photosensitive material. The lesser light as represented by arrow 34 travels through the liquid crystal as arrow 42 which is substantially undiminished in magnitude from arrow 34. It will be noted that arrow 38 has a greater magnitude than arrow 42 but that this differential is less than between arrows 32 and 34 so that the light striking the photosensitive layer 14 will produce a resulting image having less contrast than the image of the original slide transparency 6.

A suitable liquid crystal material is a nematic mesophase, such as N-[p-methoxybenzylidene]-p-butylaniline, and a cholesteric mesophase of chesleryl oleyl carbonate. The photoconductive material is 4,4'-diethylamino-2,2' demethyltriphenol methane and a polycarbonate resin together with a pyrylium dye prepared as in Example 1 of British Pat. No. 1,153,506 issued Sept. 24, 1969.

A suitable thickness for the liquid crystal layer is 12 microns and is 10 microns for the photoconductive layer. The two layers conveniently are separated by a layer of cellulose nitrate of one micron or less in thickness which layer is to inhibit adverse chemical reactions between the liquid crystal material and the photoconductive material.

A potential of 250 to 400 volts across electrodes 20 and 22 is satisfactory. A light intensity of 1000-foot candles is suitable, although this may vary depending on the photographic characteristics of surface 14.

When it is desired to project another slide transparency, the liquid crystal layer 30 can be made transparent throughout again by opening switch 26 momentarily to remove the potential across the liquid crystal layer. For a subsequent projection of another image slide transparency 6 may be replaced with a second slide transparency and this image projected through the sandwich while switch 26 is closed.

From the foregoing, the advantages of this invention are readily apparent. A projection device has been provided for masking a slide transparency image as it is projected to reduce contrast. This masking device is provided in the form of a photoconductive-liquid crystal sandwich which requires no registration with the slide transparency nor is any developing solution required to form the mask image.

The invention has been described in detail with reference to a preferred embodiment thereof, but it will be understood that variations and modifications can be effected within the spirit and scope of the invention.

I claim:

1. In an apparatus for projecting a transparency image onto a photosensitive material supported in an image plane including means for supporting a transparency in a projection plane, and means for projecting the transparency image along a projection path onto the photosensitive material an improvement located in said projection path between the transparency and the photosensitive material for reducing contrast of the projected image on the photosensitive material, said improvement comprising in order a layered structure having:
   a first transparent electrode adjacent said transparency supporting means;
   a transparent photoconductive layer positioned between said first electrode and the photosensitive material support means and in contiguous relationship to said first electrode;
   a liquid crystal layer in contiguous relationship to said photoconductive layer;
   a second transparent electrode in contiguous relationship to said liquid crystal layer; and
   means for applying a potential between said first and second transparent electrodes.

2. Apparatus for projecting a slide transparency image, having lighter and darker areas, onto a photosensitive surface at reduced contrast, said apparatus comprising:
   a mount for supporting a slide transparency in a projection plane;
   means for supporting the photosensitive surface at an image plane along said projection path;
   means for projecting the slide transparency image along a projection path onto the photosensitive surface; and
   a layered photoconductive-liquid crystal sandwich interposed in said projection path, said sandwich having means for applying a potential thereacross so that the lighter areas selectively increase the conductivity of the photoconductive layer to cause corresponding areas of the liquid crystal layer to diffuse light to a greater extent that in those portions corresponding to the darker areas so that the image projected along said projection path through said sandwich to be formed on the photosensitive surfaces has less contrast than the original slide transparency image.

3. Apparatus for projecting an image onto an image plane including means for supporting an image bearing member in an object plane spaced from said image plane, an illumination source for illuminating a supported image bearing member to form an image pattern, means for projecting the pattern from said illuminated image bearing member along a projection path to said image plane, and intermediate image storage means located between said illumination source and said image plane, said image storage means comprising a layered structure including first and second transparent electrodes, a substantially transparent photoconductive layer and a liquid crystal layer sandwiched between said first and second transparent electrodes, and means for applying a potential between said first and second electrodes to render said storage means capable of storing an image therein, said layered structure being oriented so that said photoconductive layer is positioned to receive the image pattern from a supported, illuminated, image bearing member and, upon application of potential to said electrodes, form a corresponding pattern of light diffusion in said liquid crystal layer.

4. The apparatus of claim 3 wherein said image bearing member support means is located between said illumination source and said intermediate image storage means.

5. For use in image projection apparatus, an improved device for imagewise regulating light transmission, said device comprising a layered structure having:
   a first transparent electrode;
   a transparent photoconductive layer in contiguous relationship to said first transparent electrode;
   a liquid crystal layer in contiguous relationship to said photoconductive layer;
   a second transparent electrode in contiguous relationship to said liquid crystal layer; and
   means for applying a potential between said first and second transparent electrodes.

6. Apparatus for forming at an image plane an illumination pattern related to the image pattern on a selected image bearing medium, said apparatus comprising:
   image storage means spaced from said image plane, said image storage means comprising a pair of transparent electrodes, a liquid crystal layer, a transparent photoconductive layer, said liquid crystal layer and said photoconductive layer being sandwiched between said electrodes, and means for applying an electrical potential between said electrodes, said image storage means being responsive to applications thereto of a radiation pattern corresponding to the image on said image bearing medium while said electric potential is applied to form in said liquid crystal layer an intermediate image pattern of clear and diffuse areas imagewise related to said radiation pattern; and
   means for applying said radiation pattern from said image bearing medium to said image storage means to form said intermediate image pattern and for projecting light through said image bearing medium and said intermediate image pattern and along a path to said image plane, including means located in said path between said image storage means and said image plane for imaging the light pattern projected through said image bearing medium and said image storage means at said image plane.

* * * * *